(12) United States Patent  
O'Meara et al.

(10) Patent No.: US 6,304,052 B1
(45) Date of Patent: Oct. 16, 2001

(54) CONTROL SYSTEM FOR A PERMANENT MAGNET MOTOR

(75) Inventors: Thomas P. O'Meara, Redondo Beach; Nitinkumar Ratilal Patel, Buena Park, both of CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/604,441

(22) Filed: Jun. 27, 2000

(51) Int. Cl.$^7$ .................................................. H02P 21/00
(52) U.S. Cl. ..................... 318/700; 318/254; 318/138; 318/439; 318/705; 318/811
(58) Field of Search ..................... 318/700–724, 318/138, 254, 439, 811

(56) References Cited

U.S. PATENT DOCUMENTS

| | | | |
|---|---|---|---|
| 4,649,331 | * 3/1987 | Jahns ..................... | 318/796 |
| 5,585,709 | * 12/1996 | Jansen et al. ............. | 318/807 |
| 5,818,192 | * 10/1998 | Nozari .................... | 318/609 |
| 6,008,618 | 12/1999 | Bose et al. ............... | 318/811 |
| 6,037,741 | * 3/2000 | Yamada et al. ............ | 318/721 |
| 6,051,946 | * 4/2000 | Yamada et al. ............ | 318/432 |
| 6,163,128 | * 12/2000 | Hiti et al. ............... | 318/722 |

OTHER PUBLICATIONS

Pending U.S. Patent Application, Ser. No. 09/444,437, entitled, "System And Method For Controlling A Position Sensorless Permanent Magnet Motor", assigned to the assignee of the present invention.

Pending U.S. Patent Application, Ser. No. 09/409,890, entitled, "Method For Determining Rotor Position", assigned to the assignee of the present invention.

* cited by examiner

Primary Examiner—Robert E. Nappi
Assistant Examiner—Rita Leykin
(74) Attorney, Agent, or Firm—Anthony Luke Simon

(57) ABSTRACT

A control system for an interior permanent magnet motor which includes five regulators to provide efficient control of the motor. Deviation from a desired maximum torque per amp trajectory is minimized by making two of the five regulators field-weakening regulators. First and second regulators provide current control of the quadrature-axis current and direct-axis current, respectively. A limiter limits the direct-axis current from exceeding the maximum allowed stator current and any excess current is added to the quadrature-axis current. Fourth and fifth regulators are field-weakening regulators. The fourth regulator generates a first field-weakening signal that increases the direct-axis signal when the quadrature-axis voltage approaches a desired maximum voltage. The fifth regulator generates a second field-weakening signal that decreases the quadrature-axis current signal when the direct-axis voltage approaches a desired maximum voltage. An inverter circuit applies a modulated current signal to the motor in accordance with the five regulators.

14 Claims, 3 Drawing Sheets

CONTROL SYSTEM FOR A PERMANENT MAGNET MOTOR

TECHNICAL FIELD

This invention relates to control systems for permanent magnet motors and more particularly to a control system for a permanent magnet motor that includes five regulators to obtain optimum motor efficiency under various operating conditions.

BACKGROUND OF THE INVENTION

It is known in the art relating to permanent magnet motors to control the torque of the motor by controlling the current supplied to the motor. Typically, an interior permanent magnet motor includes a stator having multiphase windings and a rotor having permanent magnets located internally which are surrounded by pole pieces. The magnetic field of the stator produced by the stator windings interacts with the magnetic field of the rotor, causing the rotor to rotate. The rotor magnetic field is produced by permanent magnets.

The rotation or torque of the motor is controlled by governing the magnitude and duration of the current applied to the stator windings. To generate the magnetic field, the stator current is switched on and off in each stator phase winding in a predetermined sequence synchronized with the rotor position. Usually, the stator current signal is a pulse width modulated signal applied by an inverter to the windings. A stator current command signal may be determined based upon a maximum torque per amp trajectory. After the desired trajectory is determined, current regulators maintain the current command signal at the stator windings. The current regulators may be a hysteretic type of current regulator or a proportional-integral PI current regulator. The motor is run most efficiently at the maximum torque per amp trajectory. Therefore, it is desirable to have a control system for a permanent magnet motor that minimizes the deviation from that maximum torque per amp trajectory.

SUMMARY OF THE INVENTION

The present invention provides a control system for controlling a permanent magnet motor that includes five regulators. The first regulator receives a torque command signal indicative of the desired motor torque and an actual motor torque signal and provides a stator current command signal in response to the difference between the actual motor torque and a torque command signal. A maximum per amp trajectory is determined from the torque command signal. The trajectory is divided into a sine and cosine component having an angle β representing the angle between the stator current and the quadrature-axis.

Next, the stator current command signal is multiplied with the sine and cosine functions to obtained a direct-axis current command signal and a quadrature-axis current command signal, respectively. The quadrature and direct axis current command signals are combined with motor quadrature and direct axis current signals to provide modified direct-axis and quadrature-axis current command signals indicative of the desired motor torque. After the modified direct-axis and quadrature-axis current command signals are provided, a limiter prevents the modified direct-axis current command signal from exceeding a maximum stator current and any current in excess of the maximum stator current is added to the modified quadrature-axis current command signal.

The second and third regulators are current regulators that provide regulated quadrature-axis and direct-axis current command signals which are responsive to the difference between the respective current command signals and motor current signals.

A fourth regulator is provided to generate a first field-weakening signal that increases the direct-axis current signal when the quadrature-axis voltage approaches a desired maximum voltage. A fifth regulator is provided to generate a second field-weakening signal that increases the direct-axis current signal when the quadrature-axis voltage approaches a desired maximum voltage. The regulated direct-axis and quadrature-axis current signals are combined to form a pulse width modulated signal that is applied to the motor through an inverter. The fourth and fifth regulators act independently from each other when modifying the direct-axis and quadrature-axis current signals. Each field-weakening signal operates independently of motor parameters, resulting in a more stable control of the motor.

In one embodiment of the invention the motor torque is determined by a torque estimator. The torque estimator determines the motor torque from the motor quadrature-axis and direct-axis current signals, motor speed and dc voltage supplied to the inverter. The estimator uses equivalence between electrical power and mechanical power in the calculations so therefore, measured magnetic core losses, copper losses and other system losses are compensated through interpolation. Therefore, this method will automatically compensate for changes inductance and magnetic flux with load and temperature. However, the only exception is the stator resistance which varies with temperature, resulting in minor changes in torque that remain uncompensated. Thus, the present invention may provide a torque that is more accurate under temperature variations of the motor and under heavy motor magnetic saturation. Further, the invention may provide a control system that operates the motor near an optimum torque per amp trajectory, resulting in reduced power inverter rating and inverter cost.

These and other features and advantages of the invention will be more fully understood from the following description of certain specific embodiments of the invention taken together with the accompanying drawings.

DESCRIPTION OF THE PREFERRED EMBODIMENT

Figure 1:
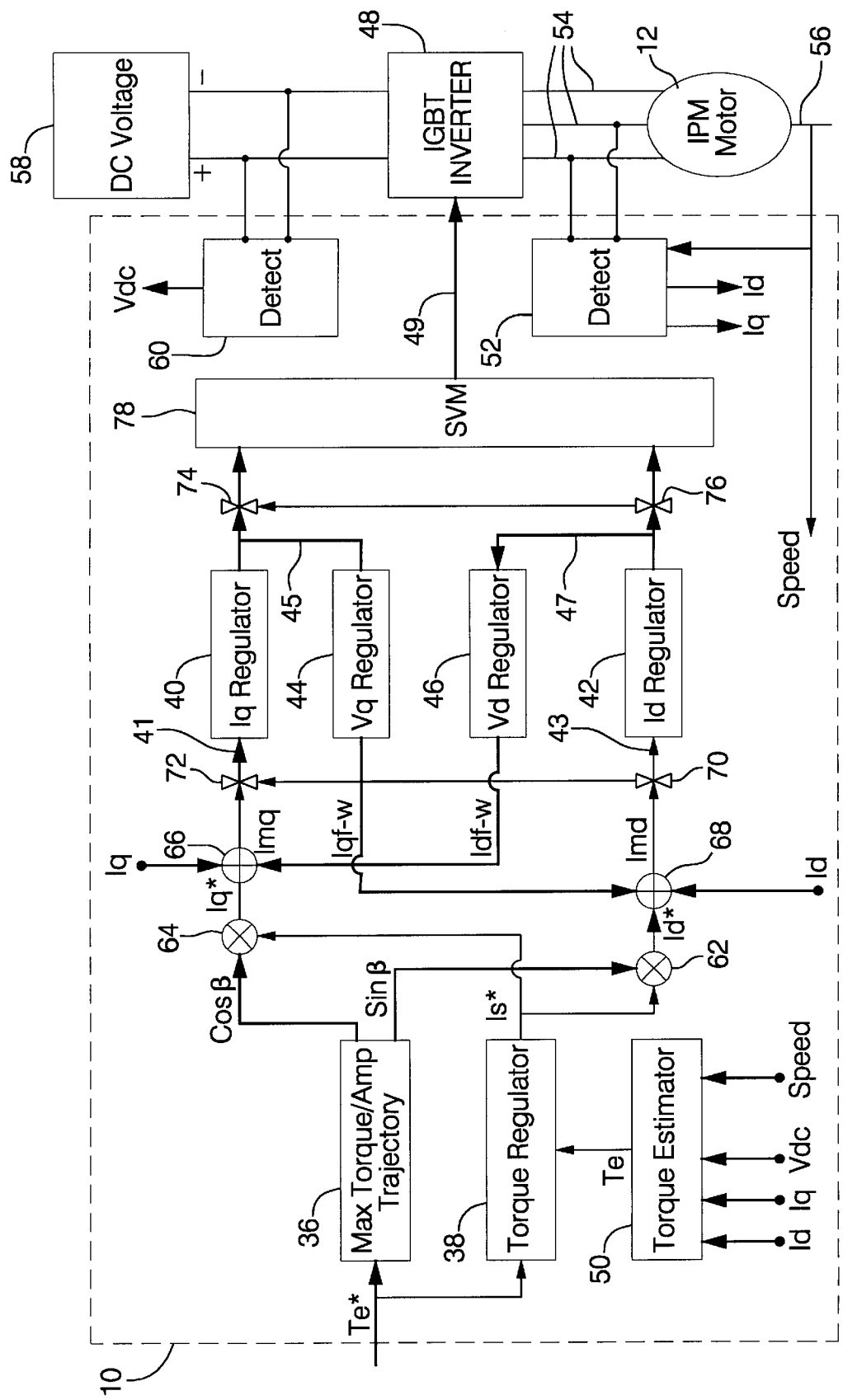
FIG. 1 is a block diagram of a control system for a permanent magnet motor in accordance with the present invention.
Figure 2:
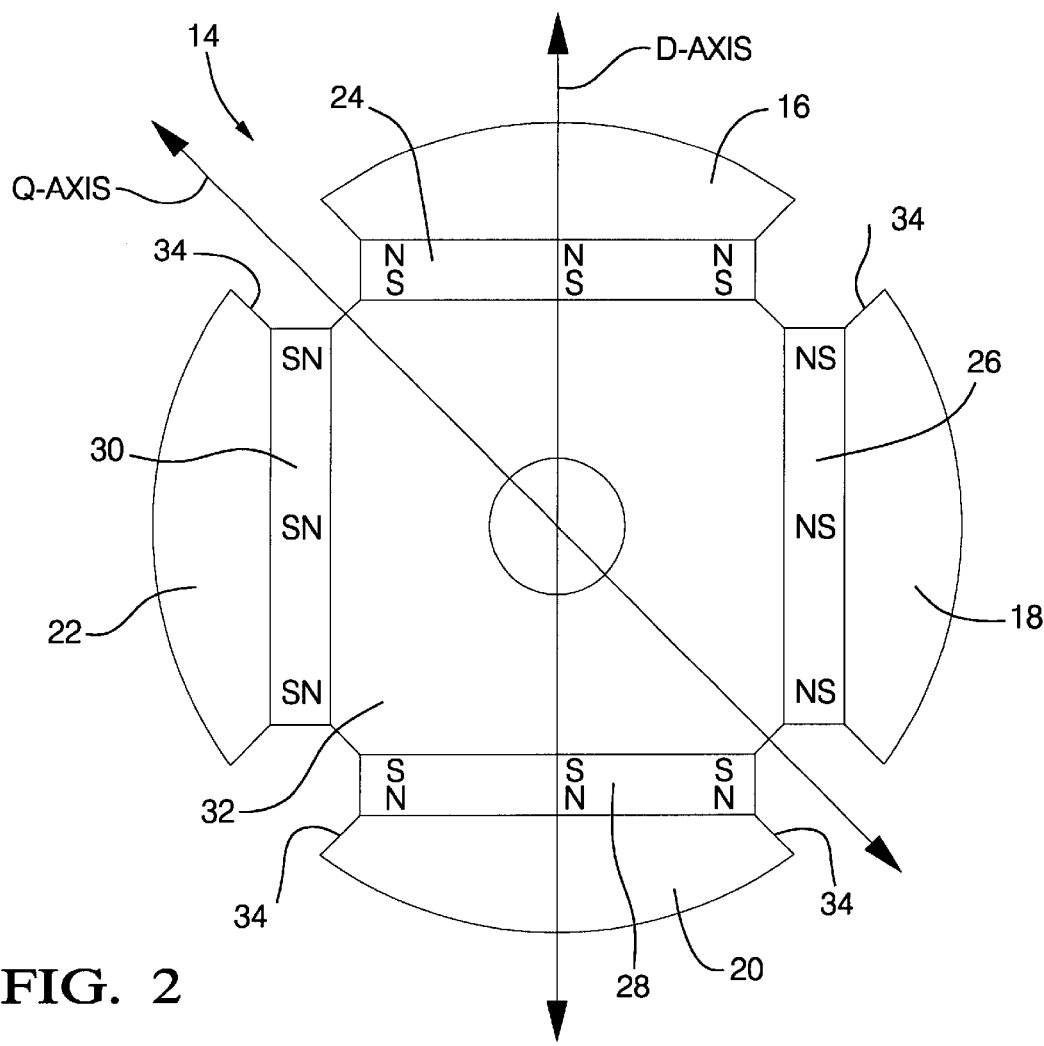
FIG. 2 is a end view of a rotor of an interior permanent magnet motor showing the quadrature-axis and direct-axis.

Referring now to FIGS. 1 and 2 of the drawings in detail, numeral 10 generally indicates a control system for an interior permanent magnet motor 12. Motor 12 generally includes a stator (not shown) and a rotor. The rotor rotates when a magnetic field of the stator produced by the stator windings interacts with the magnetic field of the rotor. The rotor magnetic field is produced by permanent magnets. The permanent magnets may be located at the surface of the rotor or as in an interior permanent magnet motor they may be located in the interior of the rotor, surrounded by pole pieces.

An interior permanent magnet rotor 14 is shown in FIG. 2. Rotor 14 may be comprised of a stack of rotor laminations connected to a shaft (not shown). Each lamination has a plurality of pole pieces 16,18,20,22. Permanent magnets 24,26,28,30 are inserted between pole pieces 16,18,20,22, respectively, and rotor laminations core 32. N and S indicate the north and south poles of magnets 24,26,28,30. Axial voids 34 may be cased with aluminum to help retain magnets 24,26,28,30 and to form a portion of a starting cage (not shown).

The permanent magnets 24,26,28,30 are arranged to form a four pole rotor. Rotor 14 has a direct-axis, or d-axis, in line with the rotor north pole center line. A quadrature-axis, or q-axis, is located 90 electrical degrees from the d-axis between adjacent poles. In the four pole rotor, the q-axis is 45 mechanical degrees from the d-axis. Although the present invention is described for a four pole rotor, it can be generalized to other number of poles (e.g. 2,6, etc.) with the understanding; that the q-axis is located between adjacent poles.

The torque developed by the interior permanent magnet motor may be controlled by controlling the stator current applied to the stator phase windings of the motor. The stator current Is may be represented in Cartesian coordinates by a d-axis component $I_d$ and q-axis component $I_q$ which may be expressed as:

$$I_d = I_s \sin \beta$$

$$I_q = I_s \cos \beta$$

Figure 3:
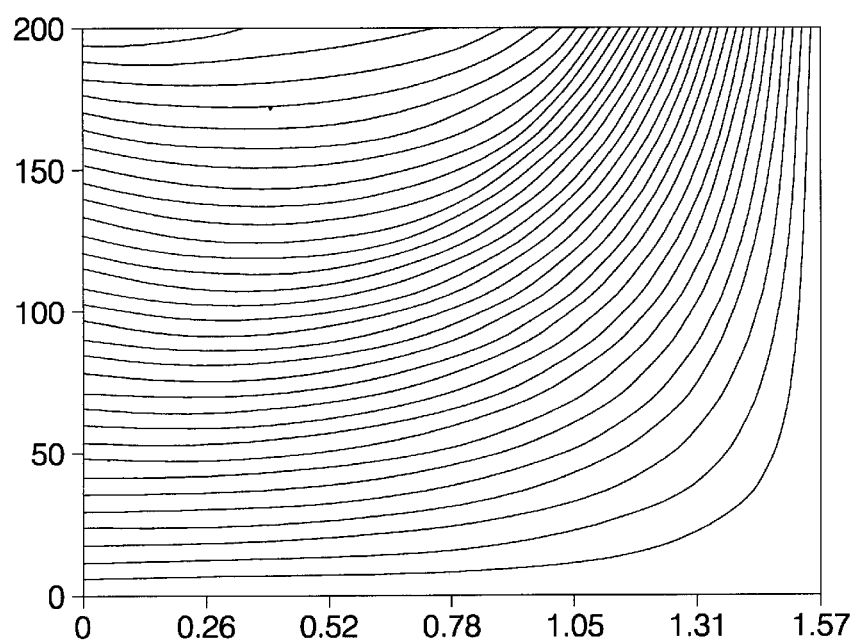
FIG. 3 is a graph of the maximum torque per amp trajectory for an interior permanent magnet motor.

The angle β is the angle at which the stator current is from the q-axis. It is possible to define a desired trajectory for the stator current $I_s$ to follow in response to a torque request which results in optimum motor operation, e.g. maximum torque per amp trajectory. FIG. 3 shows a desired maximum torque per amp trajectory for an interior permanent magnet motor. The x-axis represents β (radians) and the y-axis represents the stator current (amps). The topographic lines trace equal motor torque and the regions are also shaded wherein the white area represents the highest torque and the black area represents the lowest torque. For a given torque command signal, the most torque per amp is obtained at the point where the stator current is lowest for that torque. To operate the motor at that minimum point on the line representing desired torque, the angle β is adjusted.

In one embodiment of the invention a controller implements the control system of the present invention. The controller may be a conventional microprocessor or microcontroller, which includes such elements as a central processing unit (CPU), read only memory (ROM) devices, random access memory (RAM) devices, input-output circuitry (I/O) and an A/D converter. Generally, the system includes the controller that determines a torque command signal $T_e^*$ that will generate the desired motor torque. From the torque command signal $T_e^*$, a maximum torque per amp trajectory is determined at block 36. After the trajectory is determined, five regulators 38,40,42,44,46, shown in FIG. 1, maintain an accurate torque production under various operating conditions based upon that trajectory. An inverter 48 applies a modulated current signal to the stator windings via signal line 49. The modulated current signal is produced in accordance with the five regulators 38,40,42,44,46.

More specifically, the first regulator 38 receives the torque command signal $T_e^*$ and a motor torque signal $T_e$ indicative of the actual motor torque and provides a stator current command signal $I_s^*$. The signal $I_s^*$ is responsive to the difference between the torque command signal $T_e^*$ and the motor torque signal $T_e$.

In one embodiment of the invention the motor torque $T_e$ is determined by a torque estimator 50. The torque estimator 50 determines the motor torque from the motor quadrature-axis and direct-axis current signals, $I_q$, $I_d$, motor speed and dc voltage $V_{dc}$ supplied to the motor. The motor quadrature-axis and direct-axis current signals $I_q$, $I_d$ are measured by a current sensor 52 that is connected to the stator phase windings 54. The motor speed is measured by a speed detector 56 and the dc voltage 58 applied to the inverter 48 is measured by sensor 60. The estimator 50 uses equivalence between electrical power and mechanical power in the calculations so therefore, measured magnetic core losses, copper losses and other system losses are compensated through interpolation. Therefore, this method will automatically compensate for changes in inductance and magnetic flux with load and temperature. However, the only exception is the stator resistance which varies with temperature, resulting in minor changes in torque that remain uncompensated. Thus, the torque is more accurate under temperature variations of the motor and under heavy motor magnetic saturation.

Figure 4:
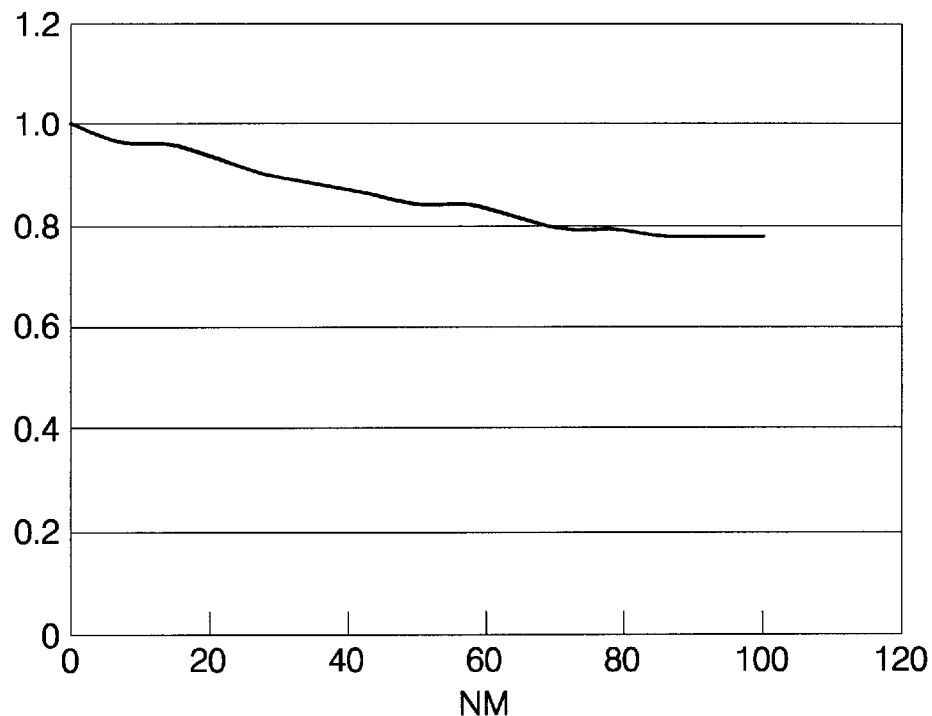
FIG. 4 is a graph illustrating torque versus cos β component of the maximum torque per amp trajectory.
Figure 5:
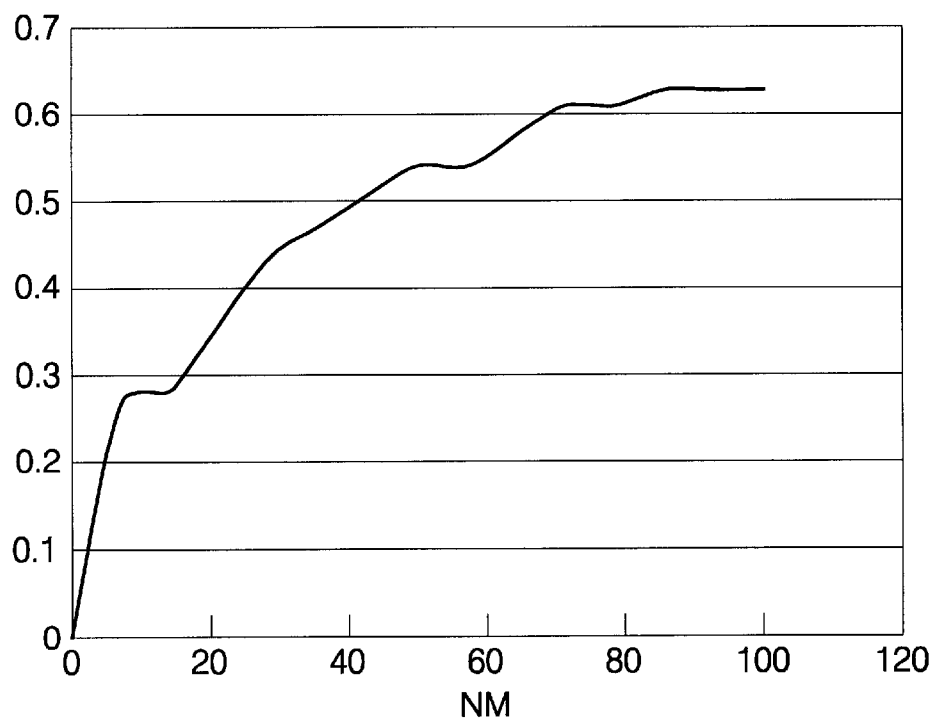
FIG. 5 is a graph illustrating torque versus sin β component of the maximum torque per amp trajectory.

Next, the maximum torque per amp trajectory is determined at block 36 and is divided into two components, sin β and cos β FIG. 4 illustrates the desired cos β versus the torque command signal and FIG. 5 illustrates the desired sin β versus the torque command signal. A direct-axis current command signal $I_d^*$ is provided by multiplying the stator current command signal $I_s^*$ with sin β at multiplier 62 and a quadrature-axis current command signal $I_q^*$ is provided by multiplying the stator current command signal $I_s^*$ by cos β at multiplier 64. These two components produce the correct current magnitude and angle for the desired trajectory.

The quadrature-axis and direct-axis current command signals $I_q^*$, $I_d^*$ are combined with motor quadrature-axis and direct-axis current signals $I_q$, $I_d$ at summers 66,68 to provide modified direct-axis and quadrature-axis current command signals $I_{md}$, $I_{mq}$. Further, the modified direct-axis current command signal $I_{md}$ is prevented from exceeding a maximum stator current $I_{max}$ at limiter 70 and any current in excess of the maximum stator current is added to the quadrature-axis current command signal $I_{mq}$ at limiter 72. The maximum stator current is derived from the following equation:

$$I_{max} = \sqrt{I_d^2 + I_q^2}$$

The second regulator 40 receives the modified quadrature-axis current command signal via signal line 41 and provides a regulated quadrature-axis current command signal which is responsive to the difference between the modified quadrature-axis current command signal $I_{mq}$ and the motor quadrature-axis current signal $I_q$. The third regulator 42 receives the modified direct-axis current command signal via signal line 43 and provides a regulated direct-axis current command signal which is responsive to the difference between the modified direct-axis current command signal $I_{md}$ and the motor direct-axis current signal $I_d$.

The fourth and fifth regulators 44,46 are field weakening control loops. The amount of field weakening provided by regulators 44,46 is determined by predetermined direct-axis and quadrature-axis voltage limits and further determined by motor stability. Stability requires that the direct-axis voltage be given priority over the quadrature-axis voltage. Thus, the direct-axis voltage receives a maximum voltage at limiter 74 and any excess voltage is received by the quadrature-axis voltage at limiter 76.

The fourth regulator 44 receives the regulated quadrature-axis current signal via signal line 45 and generates a first field weakening signal $I_{df\text{-}w}$ that increases the direct-axis current signal at summer 68 when the quadrature-axis voltage approaches a desired maximum voltage set by limiter 74. A fifth regulator 46 receives the regulated direct-axis current signal via signal line 47 and generates a second field weakening signal $I_{df\text{-}w}$ that decreases the quadrature-axis current signal at summer 66 when the direct-axis voltage approaches a desired maximum voltage set by limiter 76. The fourth and fifth regulators 44,46 act independently from each other when modifying the direct-axis and quadrature-axis current signals. Each field weakening signal operates independently of motor parameters, resulting in more stable control of the motor.

The regulated direct-axis and quadrature-axis current signals are combined at block 78 to form a pulse width modulated signal that is applied to the motor via signal line 49. Preferably, space vector modulation is used to obtain the modulated signal. The modulated signal is received by the inverter 48 and the inverter 48 applies the signal to the motor 12. The inverter 48 may be an insulated gate bipolar transistor (IGBT) inverter which includes six transistors that are turned on and off by the modulated current signal to provide current in each of the phase windings 54 in a predetermined sequence synchronized with the angular position of the rotor 14. The control system 10 of the present invention provides a near optimum torque per amp trajectory, resulting in reduced power inverter rating and inverter cost.

While this invention has been described by reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed is:

1. A control system for an interior permanent magnet motor having a rotor defining a plurality of rotor poles, a stator defining a plurality of stator poles and at least one phase winding associated with at least one stator pole, said control system comprising:

a first regulator for receiving a torque command signal and a motor torque signal and for providing a stator current command signal responsive to the difference between the motor torque and the torque command signal, said stator current command signal divided into a direct-axis current command signal aligned with a direct-axis of the rotor and a quadrature-axis current command signal aligned with a quadrature-axis of the rotor;

a second regulator for receiving a modified quadrature-axis current command signal in response to summing the quadrature-axis current command signal with a motor quadrature-axis current command signal indicative of the actual quadrature-axis current of the motor and for providing a regulated quadrature-axis current signal responsive to the difference between the modified quadrature-axis current command signal and the motor quadrature-axis current signal;

a third regulator for receiving a modified direct-axis current command signal in response to summing the direct-axis current command signal with a motor direct-axis current signal indicative of an actual direct-axis current of the motor and for providing a regulated direct-axis current signal responsive to the difference between the modified direct-axis current command signal and the motor direct-axis current signal;

a limiter for preventing the modified direct-axis current command signal from exceeding a maximum stator current and allowing any current in excess of the maximum stator current to be added to the modified quadrature-axis current command signal;

a fourth regulator for receiving the regulated quadrature-axis current signal and providing a first field weakening signal that increases the direct-axis current command signal when a quadrature-axis voltage approaches a desired maximum voltage;

a fifth regulator for receiving the regulated direct-axis current signal and for providing a second field weakening signal that decreases the quadrature-axis current command signal when a direct-axis voltage approaches a desired maximum voltage; and an inverter circuit coupled to the motor for applying a modulated current signal that is a function of the regulated direct-axis current signal and the regulated quadrature-axis current signal to the stator windings of the motor in a preselected sequence to rotate the rotor.

2. A control system as in claim 1 wherein the quadrature-axis current command signal is obtained by multiplying the stator current command signal by a cosine component of a maximum torque per amp trajectory having an angle β wherein β is the angle between the stator current command signal and the quadrature-axis of the rotor.

3. A control system as in claim 1 wherein the direct-axis current command signal is obtained by multiplying the stator current command signal by a sine component of a maximum torque per amp trajectory having an angle β wherein β is the angle between the stator current command signal and the quadrature-axis of the rotor.

4. A control system as in claim 1 wherein the maximum stator current is derived from a square root of the sum of the direct-axis current squared and the quadrature axis current squared.

5. A control system as in claim 1 wherein the first, second, third, fourth and fifth regulators are proportional-integral (PI) regulators.

6. A control system as in claim 1 wherein the motor torque signal is determined by a torque estimator.

7. A control system as in claim 6 wherein the torque estimator determines the motor torque in accordance with the motor direct-axis current signal, the motor quadrature-axis current signal, motor speed and a dc voltage applied to the motor.

8. A method for controlling an interior permanent magnet motor having a rotor defining a plurality of rotor poles, a stator defining a plurality of stator poles and at least one phase winding associated with at least one stator pole, said method comprising the steps of:

providing a stator current command signal responsive to a difference between a motor torque signal and a torque command signal;

separating the stator current command signal into a direct-axis current command signal aligned with a direct-axis of the rotor and a quadrature-axis current command signal aligned with a quadrature-axis of the rotor;

summing the quadrature-axis current command signal and a motor quadrature-axis current signal to provide a modified quadrature-axis current command signal;

summing the direct-axis current command signal and a motor direct-axis current signal to provide a modified direct-axis current command signal;

limiting the modified direct-axis current command signal from exceeding a maximum stator current and allowing any current in excess of the maximum stator current to be added to the modified quadrature-axis current command signal;

providing a regulated quadrature-axis current signal responsive to a difference between the motor quadrature-axis current signal and the modified quadrature-axis current command signal;

providing a regulated direct-axis current signal responsive to a difference between the motor direct-axis current signal and the modified direct-axis current command signal;

providing a first field weakening signal that increases the quadrature-axis current command signal when a direct-axis voltage approaches a desired maximum voltage;

providing a second field weakening signal that decreases the direct-axis current command signal when a quadrature-axis voltage approaches a desired maximum voltage;

combining the regulated direct-axis current signal and the regulated quadrature-axis current signal to provide a modulated current signal; and applying the modulated current signal to the stator windings in a preselected sequence to rotate the rotor.

9. A method as in claim 8 wherein the step of separating the stator current command signal includes multiplying the stator current command signal by a cosine component of a maximum torque per amp trajectory having an angle β wherein β is the angle between the stator current command signal and the quadrature-axis of the rotor.

10. A method as in claim 9 wherein the step of separating the stator current command signal includes multiplying the stator current command signal by a sine component of a maximum torque per amp trajectory having an angle β wherein β is the angle between the stator current command signal and the quadrature-axis of the rotor.

11. A method as in claim 8 wherein the modulated current signal applied to the motor is a vector space modulated signal.

12. A method as in claim 8 wherein the motor torque signal is determined by a torque estimator.

13. A method as in claim 12 wherein the torque estimator determines the motor torque in accordance with the motor direct-axis current signal, the motor quadrature-axis current signal, motor speed and a dc voltage applied to the motor.

14. A method as in claim 8 wherein the maximum stator current is determined as the square root of the sum of the direct-axis current squared and the quadrature-axis current squared.

* * * * *